United States Patent
Rausch et al.

[15] 3,650,894
[45] Mar. 21, 1972

[54] METHOD OF MEASURING THE NUCLEAR PHYSICAL BEHAVIOR OF BODIES

[72] Inventors: Wilfried Rausch, Dollweg; Claus Benedikt Von Der Decken, Verlautenheide/Aachen; Klaus-Peter Bachus, Aachen, all of Germany

[73] Assignee: Brown, Boveri/Krupp Reaktorbau GmbH

[22] Filed: Oct. 22, 1968

[21] Appl. No.: 769,573

Related U.S. Application Data

[63] Continuation-in-part of Ser. No. 554,803, June 2, 1966, abandoned.

[30] Foreign Application Priority Data

June 10, 1965 Germany..............................B 82346

[52] U.S. Cl.................................176/12, 176/19, 250/83.1
[51] Int. Cl.........................................................G21c 17/06
[58] Field of Search.....................................176/10, 12–16, 176/17, 18, 19, DIG. 1; 250/83, 83.1, 84.5, 83.3

[56] References Cited

UNITED STATES PATENTS

| 2,936,274 | 5/1960 | Dessauer | 176/19 X |
|---|---|---|---|
| 3,070,538 | 12/1962 | Spinrad et al. | 176/17 |
| 3,142,625 | 7/1964 | Wellborn | 176/19 X |
| 3,263,081 | 7/1966 | Wiesemann et al. | 250/83.3 |
| 3,284,306 | 11/1966 | Balla | 176/12 X |
| 3,290,220 | 12/1966 | Mitault et al. | 176/15 |

FOREIGN PATENTS OR APPLICATIONS

| 838,528 | 6/1960 | Great Britain | 176/12 |
|---|---|---|---|
| 903,760 | 8/1962 | Great Britain | 176/12 |
| 912,222 | 12/1962 | Great Britain | 176/DIG. 1 |
| 978,499 | 12/1964 | Great Britain | 176/DIG. 1 |

OTHER PUBLICATIONS

Nucleonics, Vol. 11, No. 2, Feb. 1953, pp. 32– 37.

Primary Examiner—Benjamin R. Padgett
Assistant Examiner—Harvey E. Behrend
Attorney—Michael S. Striker

[57] ABSTRACT

A method of measuring the neutron-physical behavior of elements to be examined, particularly in sampling elements from the core of a nuclear reactor, comprising introducing the elements in a continuous or substantially continuous flow into a critical facility, conducting the elements in continuous or substantially continuous motion through the critical facility with the time interval spent by the individual elements in the critical facility being less than 10 seconds, and measuring the change in the system parameters of the facility.

9 Claims, 3 Drawing Figures

MODERATOR ELEMENT

MODERATOR ELEMENT

FUEL-ELEMENT

BORON-ELEMENT

INVENTOR
WILFRIED RAUSCH
BY CLAUS BENEDIKT VON DER DECKEN
Michael S. Striker
ATTORNEY

METHOD OF MEASURING THE NUCLEAR PHYSICAL BEHAVIOR OF BODIES

CROSS-REFERENCES TO RELATED APPLICATIONS

The present application is a continuation in part of application Ser. No. 554,803, filed June 2, 1966, by the same inventors and to be abandoned.

BACKGROUND OF THE INVENTION

The present invention relates to a method of measuring the neutron-physical behavior of elements to be examined, particularly in sampling elements from the core of a nuclear reactor.

One of the most important problems arising in the design and operation of a nuclear reactor is that of obtaining information about the neutron physical properties of the elements used in the reactor. Especially during operation of pebble-bed reactors these elements are continuously circulated. Optimally burnt-up or defect elements are discharged and replaced by new elements. All other elements are fed back to different regions of the core according to their neutron-physical characteristics.

The nature and condition of these elements, therefore, more or less govern the operability and the manner of operation of a nuclear reactor, for instance by absorption of neutrons participating in nuclear fission or by neutron scatter or by the undesirable capture of neutrons and the formation of radioactive radiation sources (induced activity).

After an element appears in the fuel handling facility two types of decisions have to be taken, the decision if an element is to be discharged and the decision into which part of the core an element has to be charged. The discharge of elements for instance becomes necessary in case of mechanical defect or in case of optimally burnt-up elements. The rest of the elements has to be fed to different regions of the core depending on the type of element and its burn-up.

It is known that the neutron-physical behavior of a substance is measured by a representative cross section, based, e.g., on neutron scattering, neutron capture or nuclear fission.

For the determination of these neutron-physical properties several methods have been proposed in the art. These methods suffer, however, from major drawbacks, namely firstly that the determination of these representative cross sections requires the performance of several measurements and, moreover, measurements which must be performed at different positions of a nuclear reactor, and secondly that the measuring time is of the order of minutes and hours, for instance, when mixed samples are examined.

If only one sample requires examination this expenditure of time may be acceptable. However, if examination involves testing a large number of elements of a charge, such as 675,000 or more spherical core elements as used in pebble-bed reactors, then these methods are no longer practical. For instance, if the circulation frequency is such that during a lifetime of about 3 years every element passes through the fuel-handling facility six times in the average, this would lead to a minimum circulation frequency of 150 elements per hour. In addition, to fulfil the condition of extrapolation to bigger units the assumption of a circulation frequency of 500 elements per hour appears desirable. This puts a very stringent condition on the different facilities for the test of fuel element properties: the test rate must be better than one element per 6 seconds.

The testing has therefore in the past been carried out by random sampling only and the result has been considered to be representative of the sum of the elements of the charge.

The present invention, therefore, has the object to provide a method of measuring the neutron-physical behavior of bodies by examination in a critical facility, that is, a nuclear reactor in critical condition, while avoiding the above mentioned drawbacks and permitting the necessary measurements to be performed within a period of a few seconds.

SUMMARY OF THE INVENTION

The invention meets this object by temporarily introducing such bodies into a critical facility and measuring the change in the system parameters (change of multiplication constant or resultant change of neutron flux) of the arrangement. A critical facility shall in this sense be defined as a nuclear reactor in critical condition. The bodies are passed through the critical facility in a continuous or substantially continuous motion in such manner that the period of residence (time interval spent) in the critical facility is less than 10 seconds and preferably is between $10^{-3}$ and 1 second.

DESCRIPTION OF THE PREFERRED EMBODIMENTS

Figure 1:
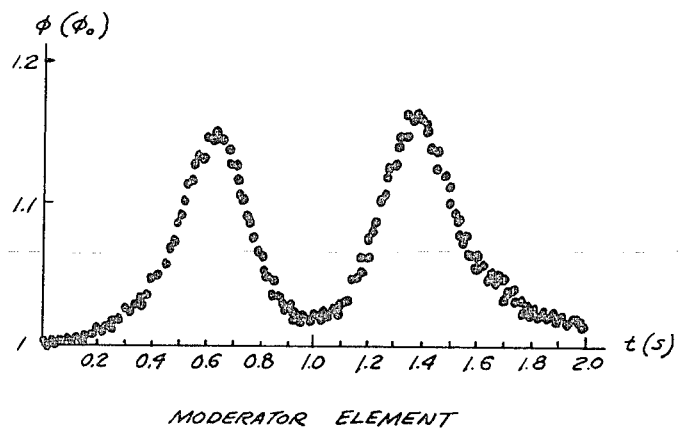
In FIG. 1 to 3 results of measurement of neutron flux $\phi$ as a function of time $t$ for different elements as indicated, are given in plotted form.

The method proposed by the present invention is based on the consideration that when introducing fissionable, absorbing or scattering substances into a critical facility, the resultant reactivity change causes a prompt change in the neutron flux of the facility. This change in neutron flux can be used as a measure of the properties of the fuel, absorber or scatterer.

The method of the invention thus is a reactivity measurement. It is based on the fact that a reactor with a sufficiently small critical mass reacts with high sensitivity to the insertion of fissile, absorbing and scattering material. The reactivity of a sample with respect to a critical facility, however, depends not only on the amount of material introduced into the reactor but on the location of the sample in the reactor.

Therefore, if the element examined moves approximately continuously through the critical facility, the neutron flux of the facility will change according to the importance function of the element at its respective location. Owing to the finite time constant $\tau$ for the prompt change of neutron flux the apparent changes in reactivity are subject to a certain degree of delay, that is to say any change due to the importance function of the sample measured is registered by the conventional measuring devices with a predetermined period of delay. So long as the change in reactivity in any particular position of the element does not vary significantly within a period corresponding to $\tau$, this delay may be neglected. This applies when the period of residence is only a few $10^{-1}$ seconds, i.e., a period which would elapse in the case of an element travelling through the critical facility in free fall.

It is thus possible to abbreviate the time of measurement to fractions of a second by making use of the fact that for a change in reactivity the change in flux due to prompt neutrons alone occurs in a few milliseconds. By simply passing a sample through a critical facility in about 1 second the resultant change in neutron flux is given primarily by the importance function of the sample. In case of a mixed sample made up of fissile, absorbing and scattering substances, such as spherical fuel elements, the relative importance of the constituent materials adds up to the signal of the fuel element.

Preferably the path of the elements that are to be examined is determined in a manner that within the critical facility they traverse maximum reactivity influence zones which are determined by the nature of the elements that are examined. Preferably each element is conducted consecutively through several positions of maximum reactivity influence related to different neutron-physical cross sections. The change in the system parameters resulting when the sample passes these zones then is the criterion of the properties possessed by the sample.

The critical facility used for performing the method should be one of minimum critical mass. A fuel with a 99 percent enriched U 235 and a graphite reflector is, therefore, preferred. Critical facilities that are suitable for performing the method of the invention are in use in research reactors. The samples to be measured, such as fuel elements of spherical shape, may with advantage be conducted successively and in a continuous manner through the critical facility.

If the samples are not suited for direct handling because of their physical state, as in the case of a gas, they may be enclosed in appropriate containers and thus passed through the critical facility.

Preferably a control means known as such in the art may be provided for determining the further course of movement or disposition of the elements in response to the results of the measurement. In these devices the response may, for instance, be a simple pulse dependent in shape and pulse height on the properties of interest. Such control means may comprise a computer in which shape and pulse height of different groups of reactor elements are stored up. The occuring pulses were compared with the stored pulses. According to the result of such comparison the sample elements are guided by computer controlled switch elements in several channels back to the reactor core, i.e., for exhausted fuel elements, outside of the reactor circle. Thus elements which are completely burnt may be separated from elements which still contain sufficient fissile material fit for reuse in the core.

In an embodiment of the invention adapted for operation with pebble-type core elements the elements were caused to roll with a definite velocity through a channel leading through the center of the critical facility.

Figure 2:
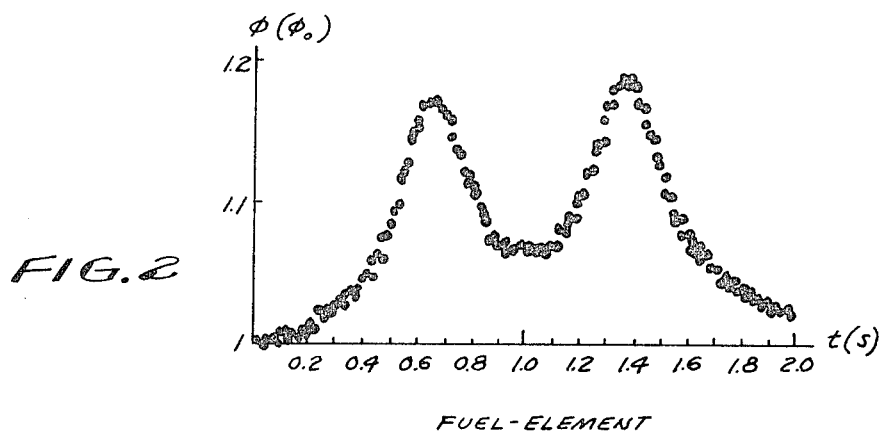
Figure 3:
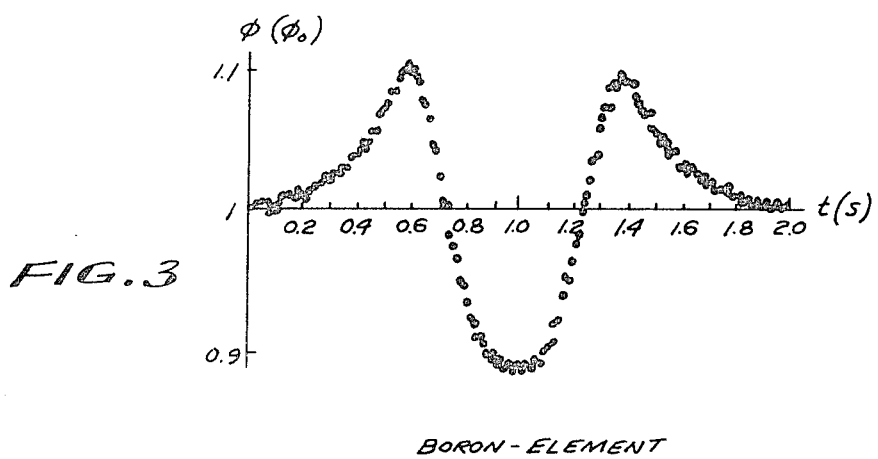

In this way the results shown in FIG. 1 to 3 were obtained. More specifically, spherical core elements of 60 mm. diameter as used in the AVR experimental power station were permitted to gain a definite velocity by first rolling down an inclined tube and then on through the central channel of the "ADIBKA 1" experimental reactor at Julich, Germany, at a neutron flux $\phi_o$ corresponding to a power of 5 watts thermal. The neutron flux was measured with an ionization chamber. FIG. 1 shows the signal obtained when a pure graphite or moderator element passed through the facility. As will be seen, the signal of a pure moderator element follows closely the importance function for scattering material. It shows the two typical peaks which result from the neutron reflecting properties of scattering material.

The signal of a fresh fuel element (FIG. 2) shows a much less pronounced minimum in the center due to the superposition of the relative importance of the fuel. The positive influence of the fissile content (1 g. of $^{235}U$) is hardly masked by the negative influence of the neutron absorbing fertile material (5 g. of $^{232}Th$).

The signal of an absorber material in the form of a boronated element (FIG. 3) containing 175 1 mg. of boron, is characterized by an extreme minimum due to the massive neutron capture by boron.

These results show the value of the method of the invention for identifying samples of different neutron physical properties and for classifying them accordingly.

They also demonstrate how fast results can be obtained since the time of interaction between the element examined and the facility employed for measurement is of the order of seconds.

The results furthermore illustrate the existence of zones of different reactivity importance in that for instance the maximum reactivity importance associated with the neutron scattering cross section appears at both outer edges of the critical facility while the maximum reactivity importance associated with the capture of fission cross section occurs at the center of the critical facility.

The method of the invention may find application not only in the fuel handling facility of pebble-bed reactors but also for the control of fuel element production and for pre- and post-irradiation examination of test elements as well as for the test of a great number of samples of nuclear material. With this method it is possible to obtain an accuracy in burn-up control of individual elements of better than 10 percent with a time of less than 1 second needed for measurement. The results also show that besides burn-up control the method of the invention is useful for distinguishing elements of special neutron-physical behavior, as for instance, elements with burnable poison.

Without further analysis, the foregoing will so fully reveal the gist of the present invention that others can by applying current knowledge readily adapt it for various applications without omitting features that, from the standpoint of prior art, fairly constitute essential characteristics of the generic, or specific aspects of this invention and, therefore, such adaptations should and are intended to be comprehended within the meaning and range of equivalence of the following claims.

What is claimed as new and desired to be protected by Letters Patent is set forth in the appended claims:

1. Method for determining the neutron-physical behavior of irradiated reactor core elements comprising the steps of removing said core elements from a first nuclear reactor, passing said core elements in a unidirectional substantially continuous flow through a second nuclear reactor in critical condition with the time interval spent by each of said core elements while passing through said second nuclear reactor being less than 10 seconds; and measuring the variations in the neutron flux of said second reactor in critical condition as a function of time while passing each of said core elements through said second reactor in critical condition, said variations being a measure of the neutron-physical behavior of said nuclear reactor core elements.

2. Method as defined in claim 1 wherein said second nuclear reactor in critical condition is of minimum critical mass.

3. Method as defined in claim 1 wherein said second nuclear reactor initially in critical condition is fueled with 99 percent enriched U 235 and has a graphite reflector.

4. Method as defined in claim 1 comprising selecting the speed of said passing of said individual core element through said second nuclear reactor initially in critical condition so that the time of said passing of said core element lies between 0.001 second and 1 second.

5. Method as defined in claim 1 wherein said first nuclear reactor is a pebble bed nuclear reactor.

6. Method as defined in claim 1 wherein said individual core elements are introduced into said second nuclear reactor in critical condition in a continuous sequence.

7. Method as defined in claim 1 wherein individual core elements are enclosed in vessels free of effect on neutron flux.

8. Method as defined in claim 1 wherein said core element is passed through said second nuclear reactor in critical condition through zones of maximum reactivity influence as determined by the nature of said core element.

9. Method as defined in claim 1 wherein said function of said neutron flux versus time is compared automatically by a computer with standard known functions stored in the computer memory and the evaluation of said core element is made by said computer.

* * * * *